US007053575B2

(12) United States Patent
Fukuhara et al.

(10) Patent No.: US 7,053,575 B2
(45) Date of Patent: May 30, 2006

(54) METHOD FOR CONTROLLING OPERATION OF POWER SEAT FOR VEHICLE

(75) Inventors: Koji Fukuhara, Tochigi (JP); Hiromasa Matsushiro, Tochigi (JP)

(73) Assignee: TS Tech Co., Ltd., (JP)

( * ) Notice: Subject to any disclaimer, the term of this patent is extended or adjusted under 35 U.S.C. 154(b) by 78 days.

(21) Appl. No.: 10/752,147

(22) Filed: Jan. 6, 2004

(65) Prior Publication Data

US 2004/0140783 A1    Jul. 22, 2004

(30) Foreign Application Priority Data

Jan. 6, 2003    (JP)    ............................. 2003-000682

(51) Int. Cl.
*H02K 1/00*    (2006.01)
(52) U.S. Cl. .................. 318/538; 318/543; 318/549; 318/552; 297/330; 297/341; 296/65.01; 296/65.12
(58) Field of Classification Search ................ 318/538, 318/543, 544, 549, 552; 297/330, 341, 232, 297/344.11, 362.11; 296/65.01, 65.12, 65.07
See application file for complete search history.

(56) References Cited

U.S. PATENT DOCUMENTS

| | | | | |
|---|---|---|---|---|
| 4,669,780 | A | * | 6/1987 | Sakakibara et al. ......... 297/257 |
| 4,812,838 | A | * | 3/1989 | Tashiro et al. ............. 340/3.42 |
| 5,507,554 | A | * | 4/1996 | Nakano et al. ......... 297/216.13 |
| 6,582,003 | B1 | * | 6/2003 | Fourrey et al. ................ 296/64 |
| 6,677,720 | B1 | * | 1/2004 | Fraser ........................ 318/445 |
| 6,820,911 | B1 | * | 11/2004 | Furui ....................... 296/65.01 |

FOREIGN PATENT DOCUMENTS

| | | |
|---|---|---|
| JP | 5170021 | 5/1993 |
| JP | 7217312 | 7/1995 |
| JP | 09188170 | 7/1997 |
| JP | 11020523 | 1/1999 |

OTHER PUBLICATIONS

Patent Abstracts of Japan, Publn. 11-020523, Jan. 26, 1999.
Patent Abstracts of Japan, Publn. 09-188170, Jul. 22, 1997.

* cited by examiner

*Primary Examiner*—Rina Duda
(74) *Attorney, Agent, or Firm*—Dann Dorfman Herrell and Skillman, P.C.

(57) ABSTRACT

A method for controlling operations of power seats for a vehicle, comprises the steps of moving a first seat toward a second seat by a first reversible motor, causing a seat cushion of the first seat to be tipped up, by a second reversible motor, relative to a seat back of the first seat which stands up, sensing loads which are applied to the first and second reversible motors, once stopping the driving of the first reversible motor, when excessive load of the first reversible motor is sensed during the movement of the first seat toward the second seat, thereafter returning the first seat to a position at which the excessive load of the first reversible motor is not sensed and stopping the movement of the first seat, once stopping the tipping-up of the seat cushion, when excessive load of the second reversible motor is sensed during the tipping-up of the seat cushion, and thereafter returning the seat cushion to an original posture thereof and stopping the movement of the seat cushion.

11 Claims, 8 Drawing Sheets

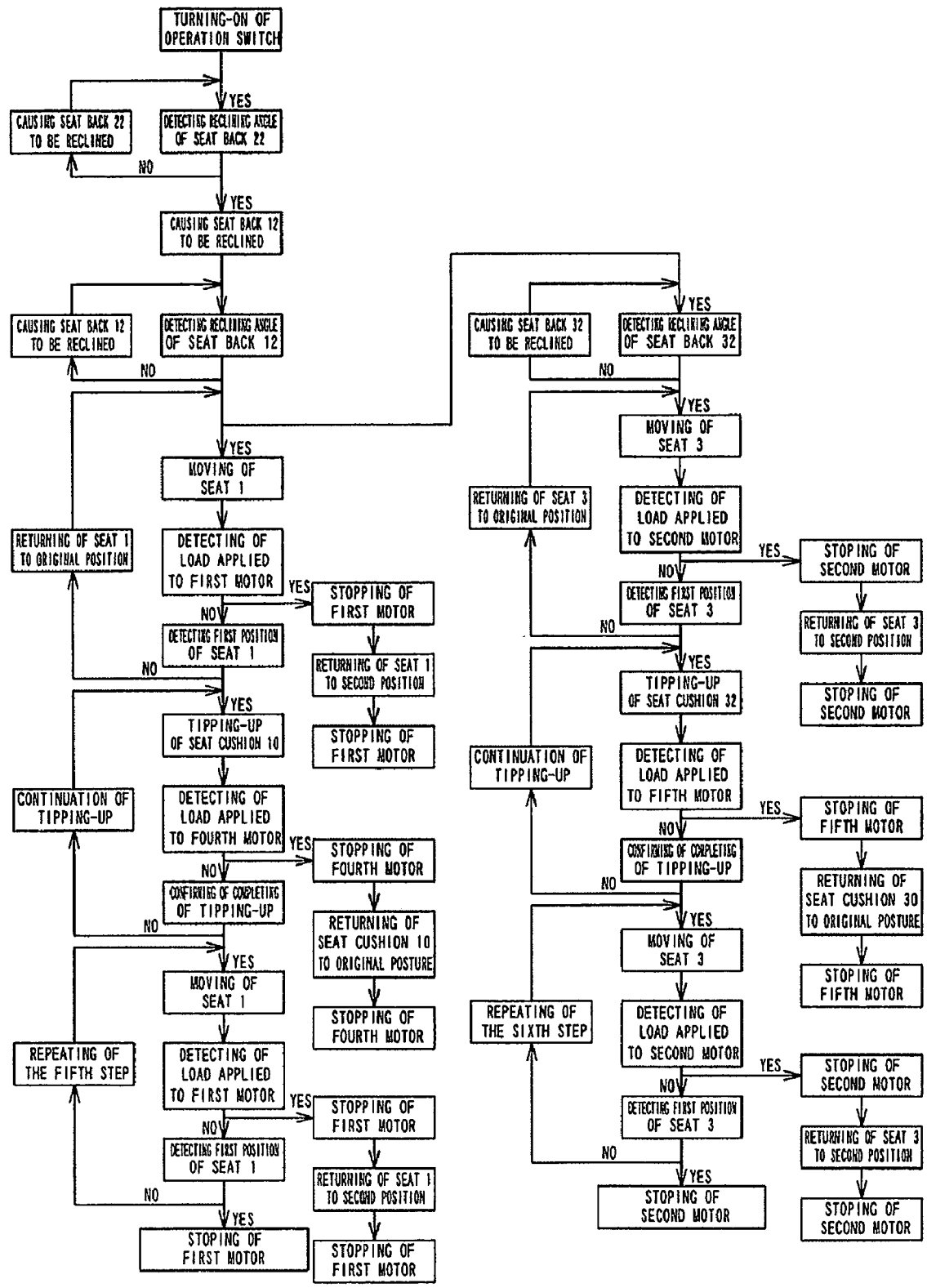

METHOD FOR CONTROLLING OPERATION OF POWER SEAT FOR VEHICLE

BACKGROUND OF THE INVENTION

1. Field of the Invention

This invention relates to a method for controlling operations of power seats for a vehicle and, more particularly, to a method for controlling operations of vehicle power seats, which comprises the steps of, for example, moving rear seats to positions immediately behind a front seat by reversible motors, and tipping-up of seat cushions of the rear seats, by reversible motors, relative to seat backs of the rear seats which stand up.

2. Description of the Related Art

In a multipurpose vehicle such as a recreation vehicle, first and second slidable seats are arranged in back of a front seat. In order obtain a space for burdens and a passenger walk-in space, there has been proposed first and rear seats which are adapted to be moved in jumped-up conditions to positions immediately behind the front seat along long length stationary rails (Japanese Patent Application laid open under Provisionary Publication No. Hei. 11-20523).

There has been also proposed a rear seat in which a seat cushion of the rear seat is adapted to be tipped up relative to a seat back of the rear seat, in lieu of the seat cushion of the rear seat being jumped up together with the seat back of the rear seat (Japanese Patent Application laid open under Provisionary Publication No. Hei. 9-188170).

In a case where the rear seat is constructed so as to be automatically moved by a reversible motor, if any foreign substance (or foreign substances) such as a burden is present between the front seat and the rear seat, there is a possibility that when the rear seat is automatically moved toward the front seat, the foreign substances will be interposed between the front seat and the rear seat, which may cause the reversible motor to malfunction or become inoperative. Also, in a case where the seat cushion of the rear seat is constructed so as to be tipped up by a reversible motor, if any foreign substance (or foreign substances) such as a burden is present between the seat cushion of the rear seat and the seat back of the rear seat, there is a possibility that when the seat cushion is tipped up, the foreign substance will be interposed between the seat cushion of the rear seats and the seat back of the rear seat, which may cause the reversible motor to malfunction or become inoperative.

Hitherto, in a power seat which is provided with power means for causing the seat to be automatically to be moved, an electrically powered recliner device and an electrically powered tipping-up mechanism for causing a seat cushion of the seat to be automatically tipped up, switches for restricting a moving range of the seat, a moving range of a seat back of the seat and a moving range of a seat cushion of the seat, and a controller for controlling the operations of the respective mechanisms are employed (Japanese Patent Application laid open under Provisionary Publication No. Hei. 5-170021). In the power seat, the operations of the respective mechanisms can be successively carried out. However, in the power seat, when any foreign substance (or foreign substances) is present between the seat cushion of the seat and the seat back of the seat, it is impossible to prevent the tipping-up operation of the seat cushion.

In addition to the above-mentioned related art, there have been proposed a motor-driven mechanism for a vehicle power window or a sunroof, which is provided with safety means which acts so as to stop the driving of a motor when any foreign substance is pinched in the power window or sunroof (Japanese Patent Application laid open under Provisionary Publication No. Hei. 7-217312).

SUMMARY OF THE INVENTION

It is therefore an object of the present invention to provide a method for controlling operations of power seats for a vehicle, which is capable of positively preventing troubles with which reversible motors for power means for causing the seats to be automatically moved and for tipping-up mechanisms for causing seat cushions of the seats to be tipped up relative to seat backs of the seats may encounter when any foreign substance are interposed between the power seats at the time of the movement of the seats or between the seat cushions of the seats and the seat backs of the seats at the time of tipping-up of the seat cushions.

It is another object of the present invention to provide a method for controlling operations of power seats for a vehicle, which is capable of positively controlling a sequence of operations of the power seats in order to comply with a request for obtaining a walk-in space and a space for burdens.

In accordance with the present invention, there is provided a method for controlling operations of power seats for a vehicle. The method for controlling operations of power seats for a vehicle, comprises the steps of moving a first seat toward a second seat by a first reversible motor, causing a seat cushion of the first seat to be tipped up, by a second reversible motor, relative to a seat back of the first seat which stands up, sensing loads which are applied to the first and second reversible motors, once stopping the driving of the first reversible motor, when excessive load of the first reversible motor is sensed during the movement of the first seat toward the second seat, thereafter returning the first seat to a position at which the excessive load of the first reversible motor is not sensed and stopping the movement of the first seat, once stopping the tipping-up of the seat cushion, when excessive load of the second reversible motor is sensed during the tipping-up of the seat cushion, and thereafter returning the seat cushion to an original posture thereof and stopping the movement of the seat cushion.

The first seat is provided with a recliner device for causing the seat back of the first seat to be reclined relative to the seat cushion of the first seat, the recliner device being adapted to be actuated by a third reversible motor, power means for moving the first seat toward the second seat, the power means being adapted to be actuated by the first reversible motor, and a tipping-up mechanism for causing the seat cushion of the first seat to be tipped up, the tipping up mechanism being adapted to be actuated by the second reversible motor. The method may comprise the steps of (a) detecting a reclining angle of a seat back of the second seat, (b) detecting a reclining angle of the seat back of the first seat, (c) moving the first seat toward the second seat and confirming whether or not the first seat is located at a first position where the seat cushion of the first seat is allowed to be tipped up, (d) causing the seat cushion of the first seat to be tipped up during the movement of the first seat, sensing a posture of the tipped-up seat cushion of the first seat, (e) confirming that the first seat arrives at a terminal point of a movable range of the first seat; (f) judging the steps (a)–(e) to be proper or improper, (g) advancing to a next step if it is judged that each of the steps (a)–(e) is proper, and returning to an original of each of the steps (a)–(e) if it is judged that each of the steps (a)–(e) is improper, and carrying out the stopping of the driving of the first reversible motor and the stopping the tipping-up of the seat cushion in the step (c)–(e).

The first seat is movably arranged in back of the second seat. The third seat is movably arranged in back of the first seat. The control of operations of the first seat and the control of operations of the third seat are carried out in side-by-side relationship with each other.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein:

FIG. 8 is a schematic flow chart of assistance in explaining a method according to a fifth embodiment of the present invention.

DETAILED DESCRIPTION OF THE PREFERRED EMBODIMENTS

Figure 1:
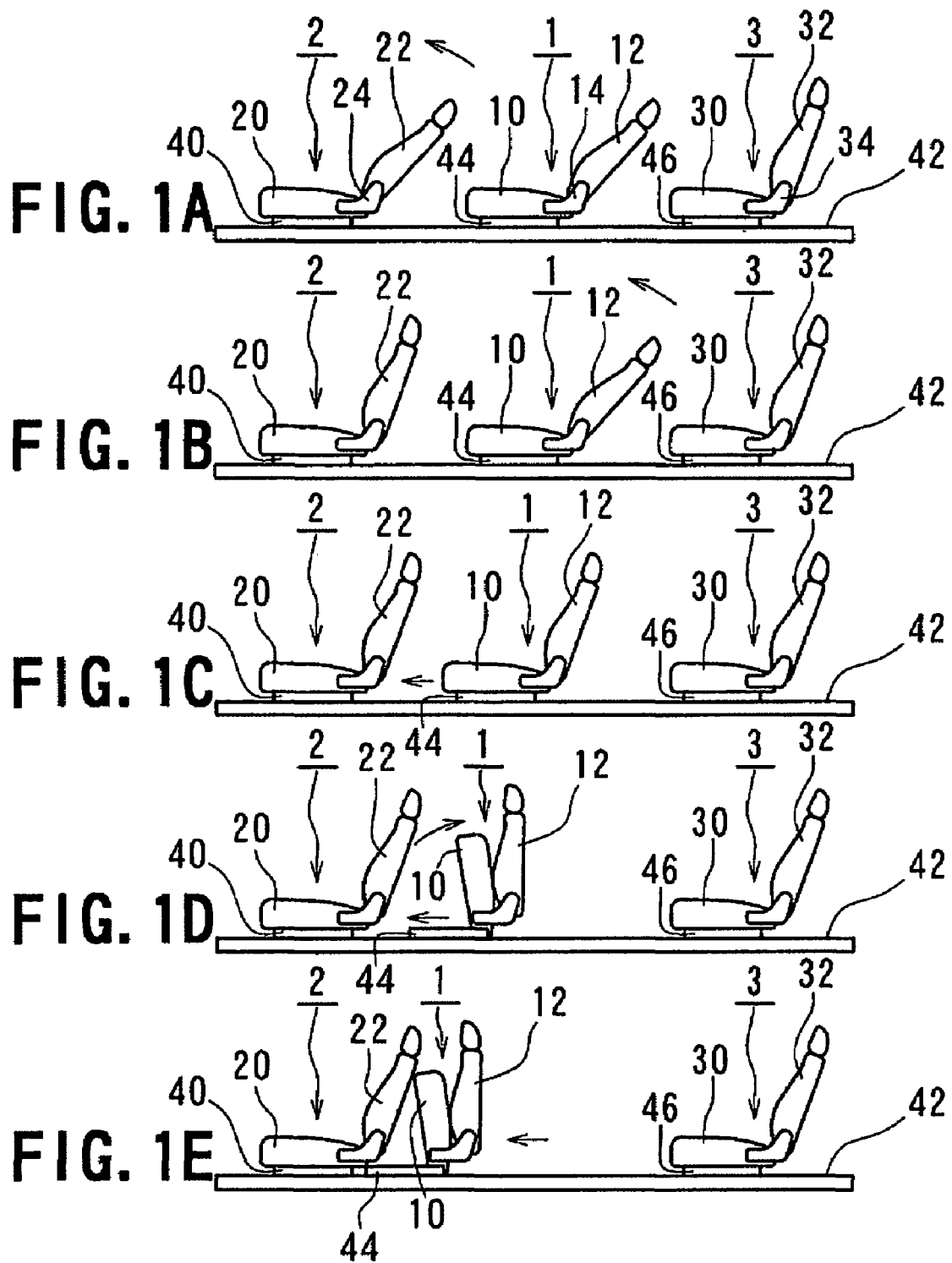
FIGS. 1A–1E are each a schematic side view illustrating seats to which a method according to a first embodiment of the present invention is applied.

A method for controlling operations of power seats for a vehicle according to the present invention will be discussed hereinafter with reference to the accompanying drawings.

Referring to FIGS. 1A–1E, power seats to which the method a first rear seat 1 which is adapted to be moved through a seat track mechanism and is arranged in back of a front seat 2 which is adapted to be moved through the seat track mechanism, and a second rear seat 3 which is adapted to be moved through the seat track mechanism and is arranged in back of the first rear seat 1. The seat track mechanism includes a pair of first substantially parallel movable rails 40 (only one first movable rail 40 is shown in FIGS. 1A–1E) attached to a seat cushion 20 of the front seat 2 in slidable relationship with a pair of substantially parallel stationary rails 42 (only one stationary rail 42 is shown in FIGS. 1A–1E) which are attached to a floor section of a vehicle, a pair of second substantially parallel movable rails 44 (only one second movable rail 44 is shown in FIGS. 1A–1E) attached to a seat cushion 10 of the first rear seat 1 in slidable relationship with the substantially parallel stationary rails 42, and a pair of third substantially parallel movable rails 46 (only one third movable rail 46 is shown in FIGS. 1A–1E) attached to a seat cushion 30 of the second rear seat 3 in slidable relationship with the substantially parallel stationary rails 42.

The first rear seat 1 is adapted to be automatically moved along the stationary rails 42 by first power means (not shown) for causing the first rear seat 1 to be automatically moved along the stationary rails 42. The first power means includes a first reversible motor. Similarly, the second rear seat 3 is adapted to be automatically moved along the stationary rails 42 by second power means (not shown) for causing the second rear seat 3 to be automatically moved along the stationary rails 42. The second power means includes a second reversible motor. The first and second reversible motors are electrically connected to a controller, for example, a CPU. The operations of the first and second reversible motors are adapted to be controlled by the controller. As the first and second power means, there may be employed any suitable conventional power means.

The first rear seat 1 is provided with a first electrically powered recliner device 14 for causing a seat back 12 of the first rear seat 1 to be reclined relative to the seat cushion 10 of the first rear seat 1, and a first electrically powered tipping-up mechanism (not shown) for causing the seat cushion 10 of the first rear seat 1 to be tipped up. The first electrically powered recliner device 14 is adapted to be actuated by a third reversible motor. The first electrically powered tipping-up mechanism is adapted to be actuated by a fourth reversible motor. Similarly, the second rear seat 3 is provided with a second electrically powered recliner device 34 for causing a seat back 32 of the second rear seat 3 to be reclined relative to the seat cushion 30 of the second rear seat 3, and a second electrically powered tipping-up mechanism (not shown) for causing the seat cushion 30 of the second rear seat 3 to be tipped up. The second electrically powered recliner device 34 is adapted to be actuated by a fifth reversible motor. The second electrically powered tipping-up mechanism is adapted to be actuated by a sixth reversible motor. The front seat 2 is provided with a third electrically powered recliner device 24 for causing a seat back 22 of the front seat 2 to be reclined relative to the seat cushion 20 of the front seat 2. The third electrically powered recliner device 24 is adapted to be actuated by a seventh reversible motor. As the first, second and third electrically powered recliner devices 14, 34, 24, there may be employed any suitable conventional electrically powered recliner devices. Also, as the first and second electrically powered tipping-up mechanisms, there may be employed any suitable conventional electrically powered tipping-up mechanisms. The third, fourth, fifth, sixth and seventh reversible motors are electrically connected to the controller. The operations of these reversible motors are adapted to be controlled by the controller.

A first terminal point of a movable range of the first rear seat 1 is previously set at a position immediately behind the front seat 2. The first rear seat 1 is adapted to be locked with respect to the stationary rails 42 at the first terminal point by a locking mechanism. A second terminal point of a movable range of the second rear seat 3 is previously set at a position immediately behind the first rear seat 1 which has arrived at the first terminal point. The second rear seat 3 is adapted to be locked with respect to the stationary rails 42 at the second terminal point by a locking mechanism.

Figure 2:
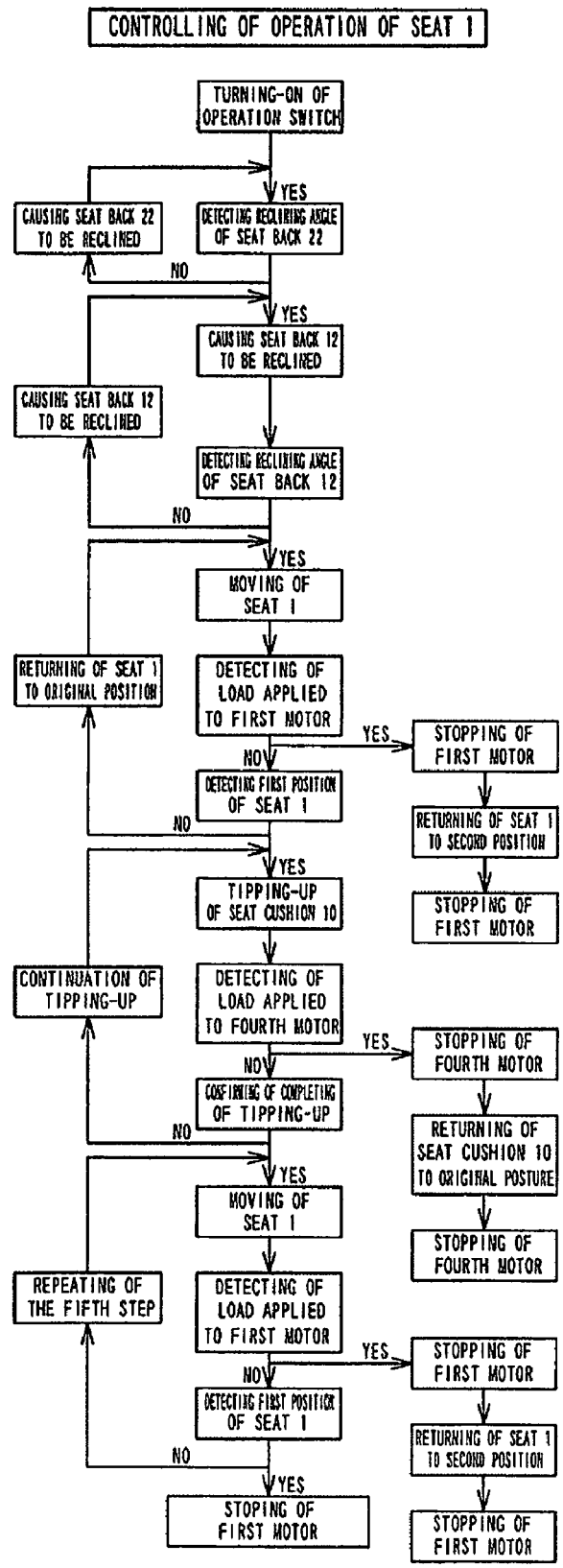
FIG. 2 is a schematic flow chart of assistance in explaining the method according to the first embodiment of the present invention.
Figure 3:
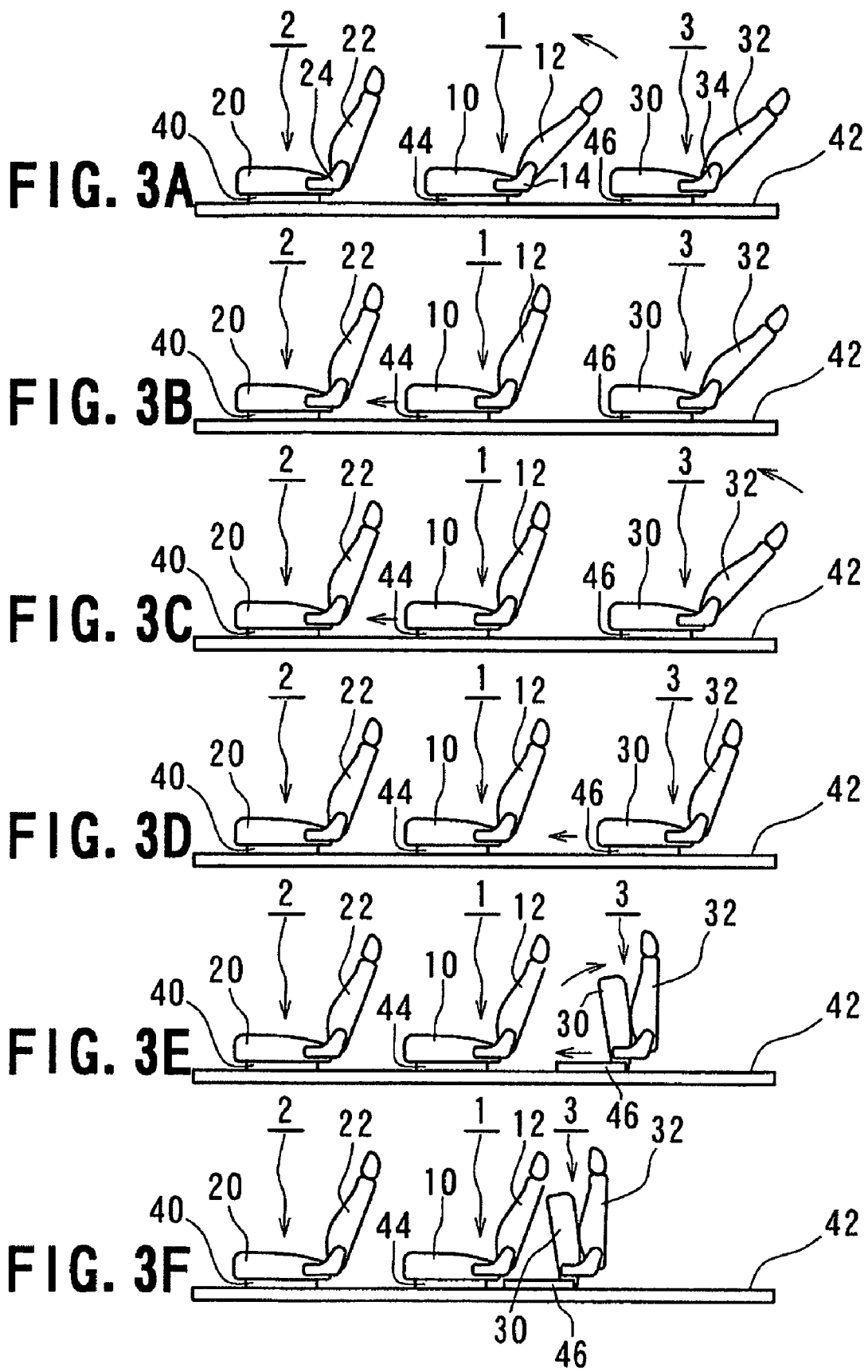
FIGS. 3A–3F are each a schematic side view showing seats to which a method according to a second embodiment of the present invention is applied.
Figure 4:
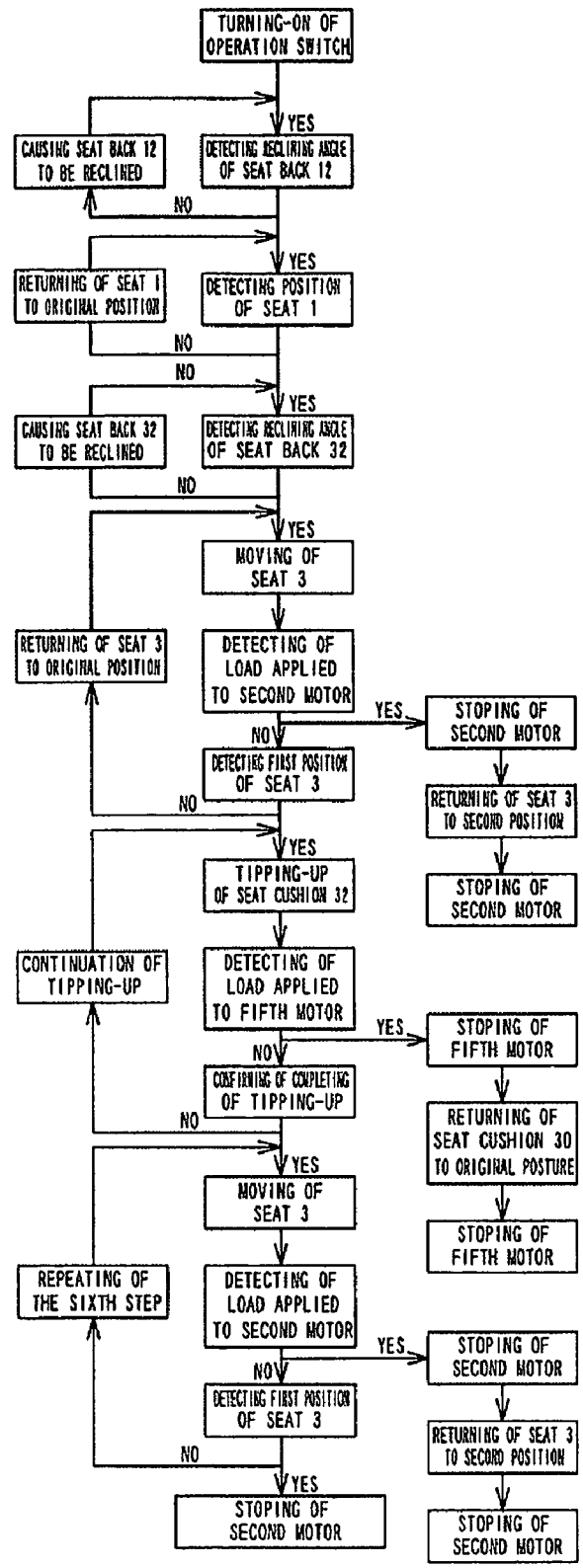
FIG. 4 is a schematic flow chart of assistance in explaining the method according to the second embodiment of the present invention.
Figure 5A:
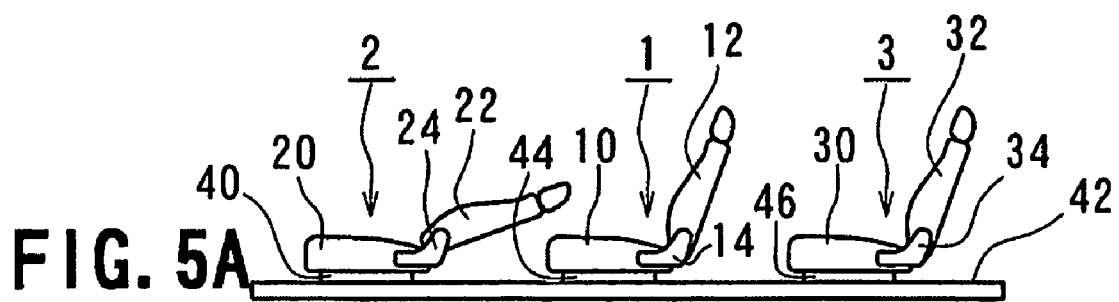
FIGS. 5A–5F are each a schematic side view showing seats to which a method according to a third embodiment of the present invention is applied.
Figure 5B:
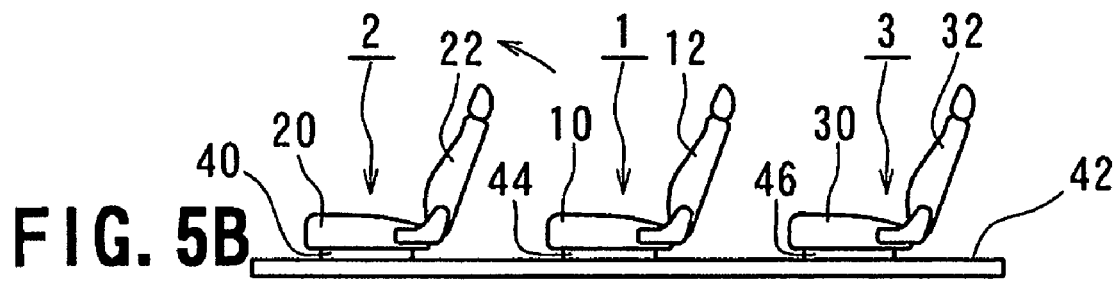
Figure 5C:
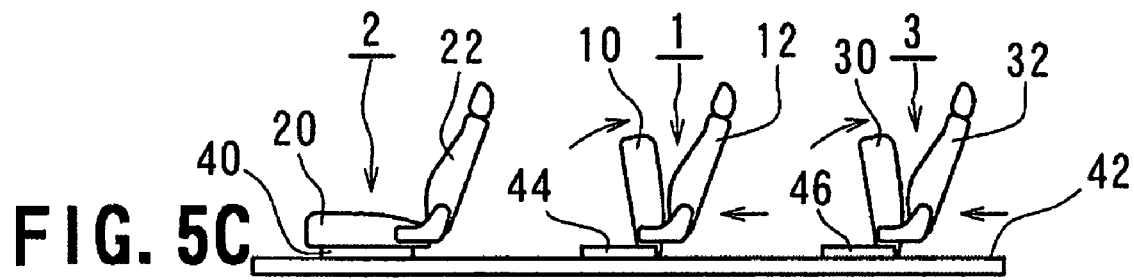
Figure 5D:
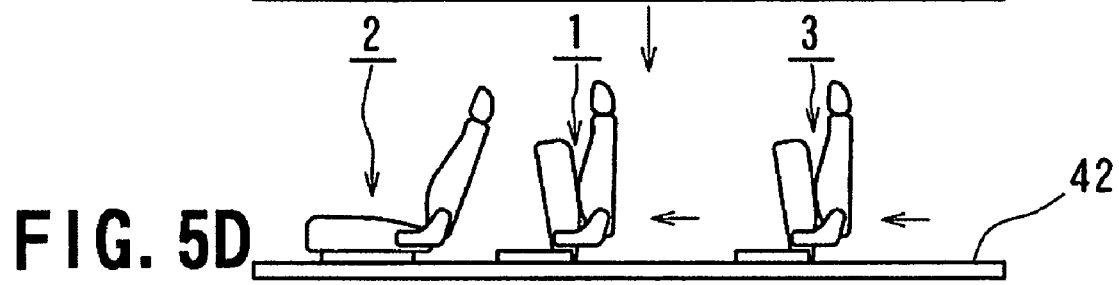
Figure 5E:
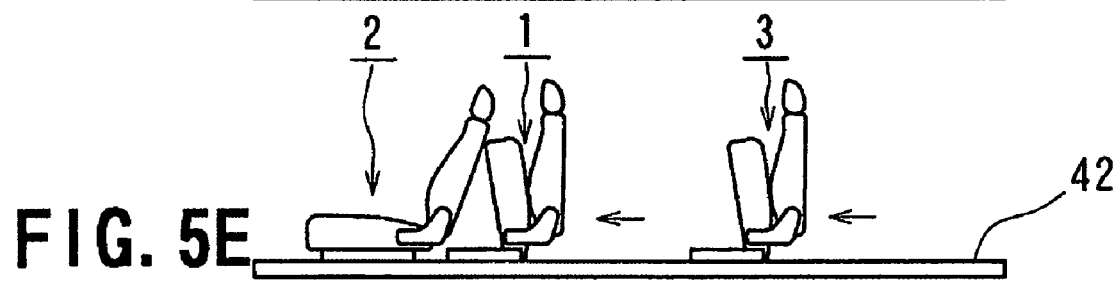
Figure 5F:
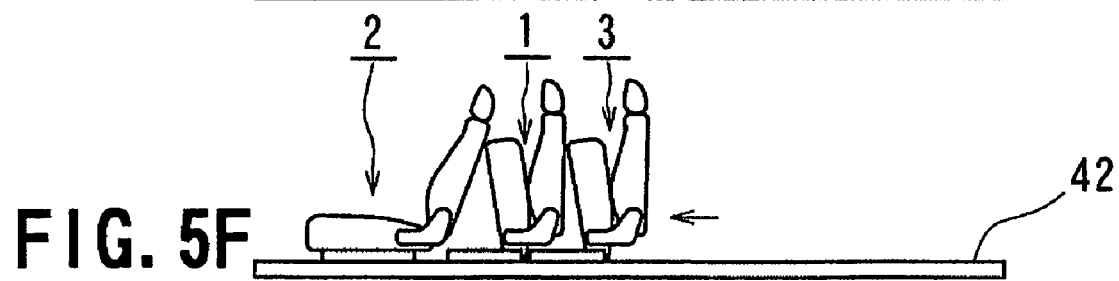
Figure 6:
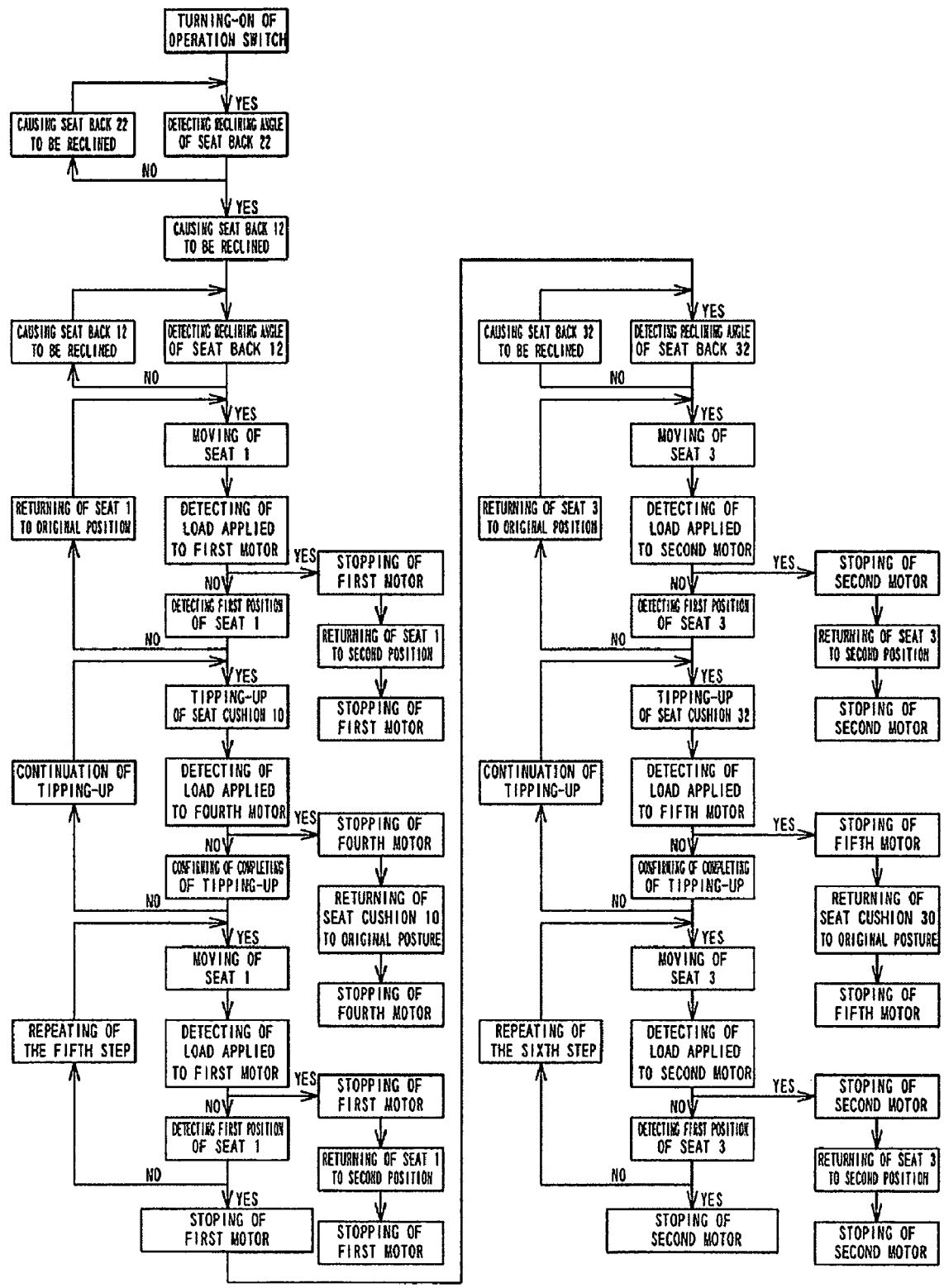
FIG. 6 is a schematic flow chart of assistance in explaining the method according to the third embodiment of the present invention.

Again referring to FIGS. 1A–1B and referring to FIG. 2, the method according to the first embodiment of the present invention is performed in order to control the operations of the first rear seat during movement of the first rear seat 1 toward the front seat 2 along the stationary rails 42. The method according to the first embodiment of the present invention comprises the steps of detecting a reclining angle of the seat back 22 of the front seat 2 (hereinafter referred to as "first step"), detecting a reclining angle of the seat back 12 of the first rear seat 1 (hereinafter referred to as "second step"), moving the first rear seat 1 toward the front seat 2 by the first reversible motor and confirming whether or not the first rear seat 1 is located within an area in which the seat cushion 10 of the first rear seat 1 is allowed to be tipped up (detecting a first position of the first rear seat 1) (hereinafter referred to as "third step"), causing the seat cushion 10 of the first rear seat 1 to be tipped up relative to the seat back 12 standing up within the area during the movement of the first rear seat 1, and sensing a posture of the tipped-up seat cushion 10 of the first rear seat 1 (hereinafter referred to as "fourth step"), and confirming that the first rear seat 1 arrives at the first terminal point of the movable range of the first rear seat 1 (hereinafter referred to as "fifth step").

The detecting of the reclining angle of the seat back 22 of the front seat 2 in the first step is performed by a first sensor or limit switch. The detecting of the reclining angle of the seat back 12 of the first rear seat 1 in the second step is carried out by a second sensor or limit switch. The sensing of the position of the first rear seat 1 in the third step is performed by a third sensor or limit switch. The sensing of the posture of the seat cushion 10 of the first rear seat 1 in the fourth step is carried out by a fourth sensor or limit switch. The sensing of the position of the first rear seat 1 in the fifth step is performed by a fifth sensor or limit switch. The first, second, third, fourth and fifth sensors are electrically connected to the controller and adapted to send signals to the controller. According to the signals sent from the first, second, third, fourth and fifth sensors, the controller is adapted to control the operations of the reversible motors. Judging of the first, second, third, fourth and fifth steps to be proper or improper is carried out. If it is judged that each of the steps is proper, a process is advanced to a next stage. If it is judged that each of the steps is improper, a process is returned to an original of each of the steps.

First of all, when an operation switch for performing the method is turned on, the first step is performed. In the first step, the first sensor detects the reclining angle of the seat back 22 of the front seat 2. By this, it is possible to confirm whether or not the seat back 22 of the front seat 2 toward which the first rear seat 1 will be moved along the stationary rails 42 from now is collapsed rearward. In a case where the first sensor confirms that the seat back 22 of the front seat 2 is not collapsed rearward, the first sensor sends to the controller a signal indicating that the seat back 22 of the front seat 2 is not collapsed rearward (YES signal). In this case, the second step is then performed. If the first sensor confirms that the seat back 22 of the front seat 2 is collapsed rearward, the first sensor sends to the controller a signal indicating that the seat back 22 of the front seat 2 is collapsed rearward (NO signal). The controller then processes the NO signal and instructs the seventh reversible motor of the third electrically powered recliner device 24 to cause the seat back 22 of the front seat 2 to be reclined at a predetermined angle relative to the seat cushion 20 of the front seat 2. When the seat back 22 of the front seat 2 is reclined at the predetermined angle relative to the seat cushion 20 of the front seat 2 by the seventh reversible motor of the third electrically powered recliner device 24 as indicated by an arrow in FIG. 1A and the first sensor confirms this condition, the first sensor sends the YES signal to the controller.

As discussed above, when the controller receives the YES signal from the first sensor, the second step is carried out. In the second step, the seat back 12 of the first rear seat 1 is relined as indicated by an arrow in FIG. 1B by the first reversible motor of the first recliner device 14 so as to become reclined relative to the seat cushion 1 of the first rear seat 1 at a predetermined angle. The second sensor detects the reclining angle of the seat back 12 of the first rear seat 1. By this, it is possible to confirm whether or not the seat back 12 of the first rear seat 1 is collapsed rearward, that is, whether or not the seat back 12 of the first rear seat 1 is in a condition where the seat cushion 10 of the first rear seat 1 may be tipped up relative to the seat back 12 of the first rear seat 1. In a case where the second sensor confirms that the seat back 12 of the first rear seat 1 is in the condition, the second sensor sends to the controller a signal indicating that the seat back 12 of the first rear seat 1 is in the condition (YES signal). In this case, the third step is then carried out. If the second sensor confirms that the seat back 12 of the first rear seat 1 is not in the condition, the second sensor sends to the controller a signal indicating that the seat back 12 of the first rear seat 1 is not in the condition (NO signal). The controller then processes the NO signal and instructs the third reversible motor of the first electrically powered recliner device 14 to cause the seat back 12 of the first rear seat 1 to be again reclined so as to become reclined at the predetermined angle relative to the seat cushion 10 of the first rear seat 2. This process is repeated until the seat back 12 of the first rear seat 1 becomes reclined at the predetermined angle relative to the seat cushion 10 of the first rear seat 1. When the seat back 12 of the first rear seat 1 is reclined at the predetermined angle relative to the seat cushion 10 of the first rear seat 1 by the third reversible motor of the first electrically powered recliner device 14, the second sensor confirms the condition of the seat back 12 and sends the YES signal to the controller.

When the controller receives the YES signal from the first sensor, the third step is performed as discussed above. In the third step, moving of the first rear seat 1 toward the front seat 2 is carried out by the first reversible motor of the first power means. During the movement of the first rear seat 1, a sixth load detecting sensor confirms whether or not an excessive load is applied to the first reversible motor of the first power means. That is, if any foreign substances such as burdens are present between the front seat 2 and the first rear seat 1 and the first rear seat 1 is abutted against the foreign substances during the movement of the first rear seat 1, an excessive load is applied to the first reversible motor of the first power means. The sixth sensor detects this condition. The sixth sensor is electrically connected to the controller and is adapted to send signals to the controller. In a case where the sixth sensor confirms that the excessive load is not applied to the first reversible motor, that is, no foreign substances are present between the front seat 2 and the first rear seat 1, the third sensor confirms whether or not the first rear seat 1 is located at the first position where the seat cushion 10 of the first rear seat 1 is allowed to be tipped up. In a case where the third sensor confirms that the first rear seat 1 is located at the first position, the fourth step is then carried out. If the third sensor confirms that the first rear seat 1 is not located at the first position, the third sensor send to the controller a signal indicating that the first rear seat 1 is not located at the first position (NO signal). When the controller receives the NO signal from the third sensor, the first reversible motor of the first power means causes the first rear seat 1 to be returned to an original position according to instructions of the controller. Then, the third step is repeated until the first rear seat 1 arrives at the first position. If the sixth sensor confirms that any foreign substances are present between the front seat 2 and the first rear seat 1, the sixth sensor sends to the controller a signal indicating that any foreign substances are present between the front seat 2 and the first rear seat 1 (YES signal). When the controller receives the YES signal from the sixth sensor, the controller processes the YES signal, causes the driving of the first reversible motor to be once stopped, instructs the first reversible motor to cause the first rear seat 1 to return to a second position at which the sixth sensor can confirm that no excessive load is applied to the first reversible motor, and stops the driving of the first reversible motor, whereby a passenger is urged to remove the foreign substances.

When it is confirmed that the foreign substances are removed and the first rear seat 1 arrives at the first position, the fourth step is then carried out. In the fourth step, tipping-up of the seat cushion 10 of the first rear seat 1 is carried out by the fourth reversible motor of the first tipping-up mechanism. During the tipping-up of the seat cushion 10 of the first rear seat 1, a seventh load detecting sensor confirms whether or not an excessive load is applied to the fourth reversible motor of the first tipping-up mechanism. That is, if any foreign substances such as burdens are present between the seat cushion 10 of the first rear seat 1 and the seat back 12 of the first rear seat 1, and the seat cushion 10 of the first rear seat 1 is abutted against the burdens during the tipping-up of the seat cushion 10, an excessive load is applied to the fourth reversible motor of the first tipping-up mechanism. The seventh sensor detects this condition. The seventh sensor is electrically connected to the controller and is adapted to send signals to the controller. In a case where the seventh sensor confirms that the excessive load is not applied to the fourth reversible motor of the first tipping-up mechanism, that is, no foreign substances are present between the seat cushion 10 of the first rear seat 1 and the seat back 12 of the first rear seat 1, the fourth sensor detects the posture of the tipped-up seat cushion 10 to confirms the completing of the tipping-up of the seat cushion 10. In a case where the fourth sensor confirms the completing of the tipping-up of the seat cushion 10, the fifth step is then carried out. If the fourth sensor confirms that the tipping-up of the seat cushion 10 is not completed, the fourth sensor sends to the controller a signal indicating that the tipping-up of the seat cushion 10 is not completed (NO signal). When the controller receives the NO signal from the fourth sensor, the controller instructs the fourth reversible motor of the first tipping-up mechanism to cause the seat cushion 10 to be tipped up again. This process is repeated until the fourth sensor confirms that the tipping-up of the seat cushion 10 is completed. If the seventh sensor confirms that the excessive load is applied to the fourth reversible motor of the first tipping-up mechanism, the seventh sensor sends to the controller a signal indicating that the excessive load is applied to the fourth reversible motor of the first tipping-up mechanism (YES signal), the controller processes the YES signal from the seventh sensor, causes the driving of the fourth reversible motor of the first tipping-up mechanism to be once stopped, and instructs the fourth reversible motor to cause the seat cushion 10 of the first rear seat 1 to be returned to its original posture. When the seat cushion 10 is returned to the original posture, the passenger is urged to remove the foreign substances between the seat cushion 10 of the first rear seat 1 and the seat back 12 of the first rear seat.

When it is confirmed that the foreign substances between the seat cushion 10 of the first rear seat 1 and the seat back 12 of the first rear seat 1 are removed and that the tipping-up of the seat cushion 10 is completed, the controller receives from the seventh sensor a signal indicating that no foreign substance are present between the seat cushion 10 of the first rear seat 1 and the seat back 12 of the first rear seat 1 (NO signal), the fifth step is then carried out. In the fifth step, movement of the first rear seat 1 toward the first terminal point is carried out by the first power means. During the movement of the first rear seat 1 toward the front seat 2, the sixth sensor again confirms whether or not an excessive load is applied to the first reversible motor, that is, any foreign substances such as burdens are present between the first rear seat 1 and the front seat 2. If the sixth sensor confirms that the excessive load is applied to the first reversible motor, the same process as described above is carried out. In a case where the sixth sensor confirms that no excessive load is applied to the first reversible motor, the fifth sensor confirms whether or not the first rear seat 1 arrives at the first terminal point. If the fifth sensor confirms that the first rear seat 1 does not arrive at the first terminal point, the fifth sensor send to the controller a signal indicating that the first rear seat 1 does not yet arrive at the first terminal point (NO signal). When the controller receives from the NO signal from the fifth sensor, the controller processes the NO signal and instructs to repeat the fifth step. This process is repeated until it is confirmed that the first rear seat 1 arrives at the first terminal point. When it is confirmed by the fifth sensor that the first rear seat 1 arrives at the terminal, the fifth sensor sends to the controller a signal indicating that the first rear seat 1 arrives at the first terminal point (YES signal). When the controller receives the YES signal from the fifth sensor, the controller stops the driving of the first reversible motor. Then, the first rear seat 1 is locked with respect to the stationary rails 42 at the first terminal point by the locking mechanism.

According to the present invention, it is possible to obtain a space for any burdens and a passenger walk-in space behinds the first rear seat 1 which has been moved to the position immediately behind the front seat 2. In addition, during the movement of the first rear seat 1, it is possible to In addition, during the movement of the first rear seat 1, it is possible to prevent any foreign substances from being interposed between the front seat 2 and the first rear seat 1, and between the seat cushion 10 of the first rear seat 1 and the seat back 12 of the first rear seat 1.

Incidentally, after the first reversible motor and the fourth reversible motor are once stopped in order that any burdens can be removed, the first and fourth reversible motors are again driven by causing the operating switch to be turned on.

Referring to FIGS. 3A–3F and 4, there is illustrated a second embodiment according to the present invention. In the second embodiment, controlling of the operations of the second rear seat 3 is controlled during movement of the second rear seat 3 to a position immediately behind the first rear seat 1. First of all, when an operation switch is turned on, a reclining angle of the seat back 12 of the first rear seat 1 is detected. Then, confirming as to whether or not the first rear seat 1 is located forward of the second terminal point of the movable range of the second rear seat 3 is performed. By this, it is possible to prevent the second rear seat 3 from being abutted against the first rear seat 1. Further, a reclining angle of the seat back 32 of the second rear seat 3 is detected. Thereafter, the steps which are discussed above in connection with the control of the operations of the first rear seat 1 are carried out.

In the first and second embodiments, the control of the operations of the first rear seat 1 and the control of the operations of the second rear seat 3 are carried out independently from each other. The control of the operations of the second rear seat 3 may be carried out successively with the control of the operations of the first rear seat 1. Also, the control of the operations of the first rear seat 1 and the control of the operations of the second rear seat may be carried out in side-by-side relationship with each other.

Referring to FIGS. 5A–5E and 6, there is illustrated a third the control of the operations of the second rear seat 3 is carried out successively with the control of the operations of the first rear seat 1.

Figure 7:
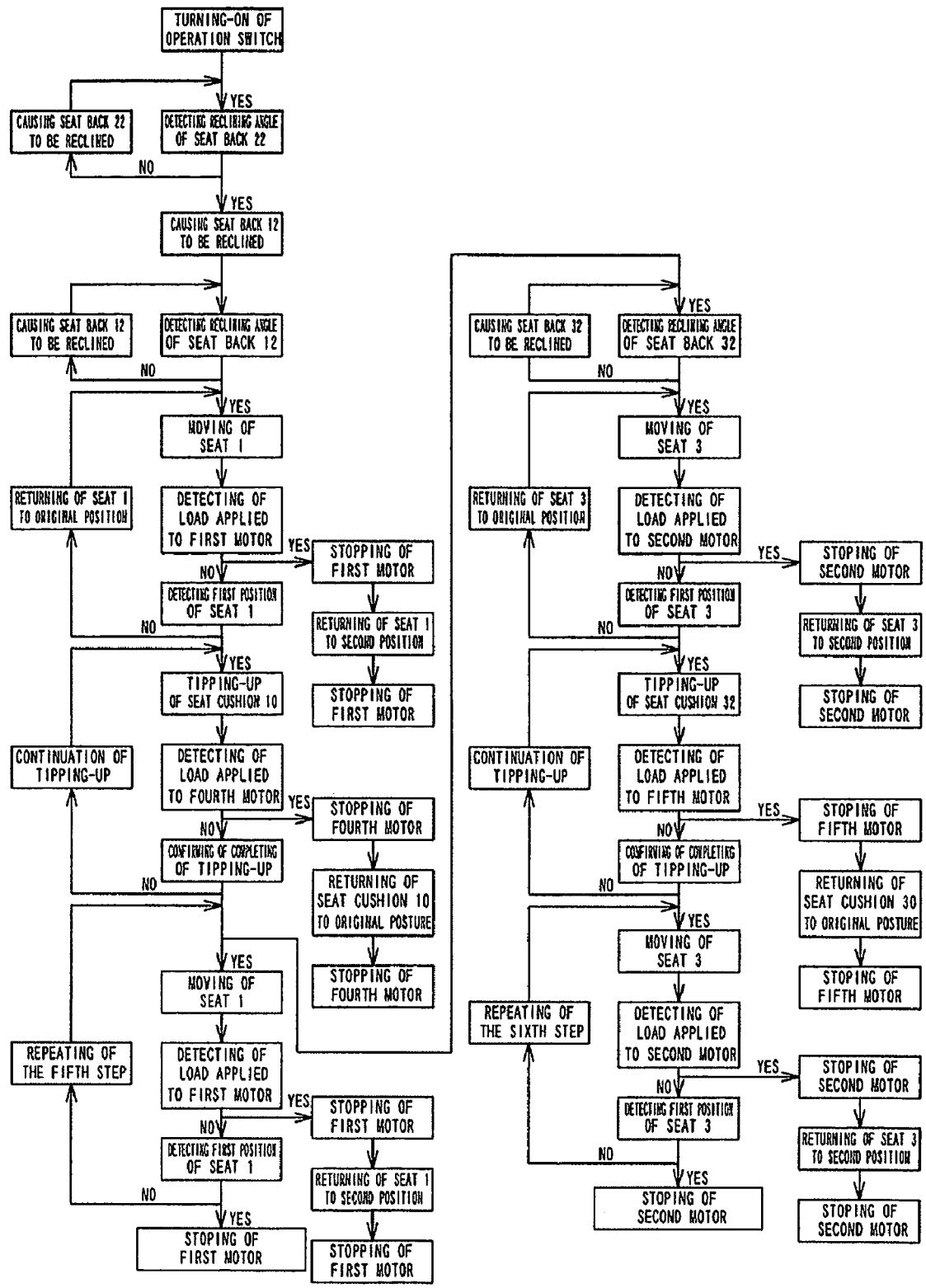
FIG. 7 is a schematic flow chart of assistance in explaining a method according to a fourth embodiment of the present invention.

Referring to FIG. 7, there is illustrated a fourth embodiment according to the present invention. In the fourth embodiment, the control of the operations of the second rear seat is performed successively with the completing of the tipping-up of the seat cushion of the first rear seat.

Referring to FIG. 8, there is illustrated a fifth embodiment according to the present invention. In the fifth embodiment, the control of the operations of the second rear seat is carried out successively with the detecting of the reclining angle of the seat back of the first rear seat. In this case, it is possible to move the first and second rear seats to the terminal points of the movable ranges thereof for a short time.

Embodiments of the present invention have been described in connection with cases where the first rear seat is moved to the position immediately behind the front seat, the second rear seat is moved to a position immediately behind the first rear seat, and the first and second rear seats are moved to positions immediately behind the front seat. However, this invention may be applied to cases where the first rear seat is moved to a position immediately ahead of the second rear seat, and the first and second rear seats are moved to rearmost positions.

The terms and expressions which have been employed herein are used as terms of description, not of limitation. There is no intention in the use of such terms and expressions of excluding any equivalents of the features shown and described or portions thereof. However, it is recognized that various modifications are possible within the scope of the invention claimed.

What is claimed is:

1. In a vehicle having powered seats including a front seat and a rear seat, wherein the rear seat is arranged in back of said front seat, the rear seat is adapted to be automatically moved in a forward/rearward direction, said rear seat includes a first seat cushion and a first seat back, the first seat cushion and the first seat back being pivotally connected to each other, the first seat back being adapted to be automatically pivoted relative to said first seat cushion, and said first seat cushion being adapted to be automatically tipped up relative to said first seat back, and said front seat includes a second seat cushion and a second seat back, said second seat cushion and said second seat back being pivotally connected to each other, and said second seat back being adapted to be automatically pivoted relative to said second seat cushion, a method performed by a programmable controller for controlling operations of the powered seats comprising the steps of:

(a) detecting a reclining angle of said second seat back relative to said second seat cushion, thereby determining whether said second seat back is inclined rearward relative to said second seat cushion;

(b) when it is determined in step (a) that said second seat back is not inclined rearward relative to said second seat cushion, then detecting a reclining angle of said first seat back relative to said first seat cushion, thereby determining whether said first seat back is inclined rearward relative to said first seat cushion, or when it is determined in step (a) that said second seat back is inclined rearward relative to said second seat cushion, causing said second seat back to be automatically pivoted forward relative to said second seat cushion by a predetermined angle and, thereafter, detecting a reclining angle of said first seat back relative to said first seat cushion, thereby determining whether said first seat back is inclined rearward relative to said first seat cushion;

(c) when it is determined in step (b) that said first seat back is not inclined rearward relative to said first seat cushion, automatically moving said rear seat toward said front seat or, when it is determined in step (b) that said first seat back is inclined rearward relative to said first seat cushion, causing said first seat back to be automatically pivoted forward relative to said first seat cushion by a predetermined angle and, thereafter, automatically moving said rear seat toward said front seat.

2. A method as set forth in claim 1 comprising the steps of:

(d) when said rear seat is moving toward said front seat, determining whether said rear seat has moved to a first position where the first seat cushion is allowed to be tipped up relative to the first seat back; and (e) when it is determined in step (d) that said rear seat has not yet arrived at the first position, further moving said rear seat toward said front seat and repeating step (d); or when it is determined in step (d) that said rear seat arrives at the first position, causing said first seat cushion to be tipped up relative to said first seat back.

3. A method as set forth in claim 2 comprising the steps of:

(f) determining an angular displacement of said first seat cushion relative to said first seat back; and (g) when it is determined in step (f) that said first seat cushion is not fully tipped-up relative to said first seat back, causing said first seat cushion to be tipped up further to a terminal angle relative to said first seat back and repeating step (f); or when it is determined in step (f) that said first seat cushion is fully tipped up relative to said first seat back, automatically causing said rear seat to move from said first position toward a terminal position immediately behind said front seat.

4. A method as set forth in claim 3 comprising the steps of:

(h) determining whether said rear seat has arrived at the terminal position; and (i) when it is determined in step (h) that said rear seat has not arrived at the terminal position, continuing to move said rear seat toward the terminal position and repeating step (h); or (j) when it is determined in step (h) that said rear seat has arrived at the terminal position, stopping the movement of said rear seat at the terminal position.

5. A method as set forth in claim 1 comprising the steps of:

when said rear seat is moving toward said front seat, determining whether an obstruction is present between said rear seat and a first position where said first seat cushion is allowed to be tipped up relative to said first seat back; and when it is determined that an obstruction is present between said rear seat and the first position, automatically performing the following steps:
stopping the movement of said rear seat;
causing said rear seat to move to a rearward position where said rear seat is clear of the obstruction; and then
stopping the movement of said rear seat at the rearward position so that the obstruction can be removed.

6. A method as set forth in claim 2 comprising the steps of:
when said first seat cushion is being tipped up relative to said first seat back, determining whether an obstruction is present between said first seat cushion and said first seat back; and
when it is determined that an obstruction is present between said first seat cushion and said first seat back, automatically performing the following steps:
stopping the tipping up of said first seat cushion;
causing said first seat cushion to move to its original position relative to said first seat back; and then
stopping the movement of said first seat cushion at the original position so that the obstruction can be removed.

7. A method as set forth in claim 3 comprising the steps of:
when said rear seat is moving from the first position toward the terminal position, determining whether an obstruction is present between said rear seat and the terminal position; and
when it is determined that an obstruction is present between said rear seat and the terminal position, automatically performing the following steps:
stopping the movement of said rear seat;
causing said rear seat to move to a rearward position where said rear seat is clear of the obstruction; and then
stopping the movement of said rear seat at the rearward position so that the obstruction can be removed.

8. In a vehicle having powered seats including a front seat, a first rear seat and a second rear seat, wherein the first rear seat is arranged in back of said front seat, and the second rear seat is arranged in back of said first rear seat, the first and second rear seats are adapted to be automatically moved in a forward/rearward direction, said first rear seat includes a first seat cushion and a first seat back, the first seat cushion and the first seat back being pivotally connected to each other, the first seat back being adapted to be automatically pivoted relative to said first seat cushion, and said first seat cushion being adapted to be automatically tipped up relative to said first seat back, said second rear seat includes a second seat cushion and a second seat back, the second seat cushion and the second seat back being pivotally connected to each other, the second seat back being adapted to be automatically pivoted relative to said second seat cushion, and said second seat cushion being adapted to be automatically tipped up relative to said second seat back, and said front seat includes a third seat cushion and a third seat back, said third seat cushion and said third seat back being pivotally connected to each other, and said third seat back being adapted to be automatically pivoted relative to said third seat cushion, a method performed by a programmable controller for controlling operations of the powered seats comprising the steps of:

(a) detecting a reclining angle of said third seat back relative to said third seat cushion, thereby determining whether said third seat back is inclined rearward relative to said third seat cushion;

(b) when it is determined in step (a) that said third seat back is not inclined rearward relative to said third seat cushion, then detecting a reclining angle of said first seat back relative to said first seat cushion, thereby determining whether said first seat back is inclined rearward relative to said first seat cushion, or
when it is determined in step (a) that said third seat back is inclined rearward relative to said third seat cushion, causing said third seat back to be automatically pivoted forward relative to said third seat cushion by a predetermined angle and, thereafter, detecting a reclining angle of said first seat back relative to said first seat cushion, thereby determining whether said first seat back is inclined rearward relative to said first seat cushion;

(c) when it is determined in step (b) that said first seat back is not inclined rearward relative to said first seat cushion, automatically moving said first rear seat toward said front seat or,
when it is determined in step (b) that said first seat back is inclined rearward relative to said first seat cushion, causing said first seat back to be automatically pivoted forward relative to said first seat cushion by a predetermined angle and, thereafter, automatically moving said first rear seat toward said front seat;

(d) detecting a reclining angle of said first seat back relative to said first seat cushion, thereby determining whether said first seat back is inclined rearward relative to said first seat cushion;

(e) when it is determined in step (d) that said first seat back is inclined rearward relative to said first seat cushion, causing said first seat back to be automatically pivoted forward relative to said first seat cushion by a predetermined angle;

(f) when it is determined in step (d) that said first seat back is not inclined rearward relative to said first seat cushion, automatically moving said second rear seat toward said first rear seat or,
when it is determined in step (d) that said first seat back is inclined rearward relative to said first seat cushion, causing said first seat back to be automatically pivoted forward relative to said first seat cushion by a predetermined angle and, thereafter, automatically moving said second rear seat toward said first rear seat.

9. A method as set forth in claim 8 comprising the steps of:

(g) when said first rear seat is moving toward said front seat, determining whether said first rear seat has moved to a first position where the first seat cushion is allowed to be tipped up relative to the first seat back; and (h) when it is determined in step (g) that said first rear seat has not yet arrived at the first position, further moving said first rear seat toward said front seat and repeating step (g); or
when it is determined in step (g) that said first rear seat arrives at the first position, causing said first seat cushion to be tipped up relative to said first seat back;

(i) when said second rear seat is moving toward said second rear seat, determining whether said second rear seat has moved to a second position where the second seat cushion is allowed to be tipped up relative to the second seat back; and (j) when it is determined in step (i) that said second rear seat has not yet arrived at the second position, further moving said second rear seat toward said first rear seat and repeating step (i); or when it is determined in step (i) that said second rear seat arrives at the second position, causing said second seat cushion to be tipped up relative to said second seat back.

10. A method as set forth in claim 9 comprising the steps of:

(k) determining an angular displacement of said first seat cushion relative to said first seat back; and (l) when it is determined in step (k) that said first seat cushion is not fully tipped-up relative to said first seat back, causing said first seat cushion to be tipped up further to a terminal angle relative to said first seat back and repeating step (k); or when it is determined in step (k) that said first seat cushion is fully tipped up relative to said first seat back, automatically causing said first rear seat to move from the first position toward a first terminal position immediately behind said front seat (m) determining an angular displacement of said second seat cushion relative to said second seat back; and (n) when it is determined in step (m) that said second seat cushion is not fully tipped-up relative to said second seat back, causing said second seat cushion to be tipped up further to a second terminal angle relative to said second seat back and repeating step (m); or when it is determined in step (m) that said second seat cushion is fully tipped up relative to said second seat back, automatically causing said second rear seat to move from the second position toward a second terminal position immediately behind said first rear seat.

11. A method as set forth in claim 10 comprising the steps of:

(o) determining whether said first rear seat has arrived at the first terminal position; and (p) when it is determined in step (o) that said first rear seat has not arrived at the first terminal position, continuing to move said first rear seat toward the first terminal position and repeating step (o); or (q) when it is determined in step (o) that said first rear seat has arrived at the first terminal position, stopping the movement of said first rear seat at the first terminal position;

(r) determining whether said second rear seat has arrived at the second terminal position; and (s) when it is determined in step (r) that said second rear seat has not arrived at the second terminal position, continuing to move said second rear seat toward the second terminal position and repeating step (r); or (t) when it is determined in step (r) that said second rear seat has arrived at the second terminal position, stopping the movement of said second rear seat at the second terminal position.

* * * * *